United States Patent
Terada et al.

(10) Patent No.: US 8,718,452 B2
(45) Date of Patent: May 6, 2014

(54) STREAM DATA RECEPTION/REPRODUCTION DEVICE AND STREAM DATA RECEPTION/REPRODUCTION METHOD

(75) Inventors: Toru Terada, Kanagawa (JP); Hiroyuki Ehara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1494 days.

(21) Appl. No.: 11/632,556

(22) PCT Filed: Jul. 14, 2005

(86) PCT No.: PCT/JP2005/013092
§ 371 (c)(1),
(2), (4) Date: Jan. 17, 2007

(87) PCT Pub. No.: WO2006/009087
PCT Pub. Date: Jan. 26, 2006

(65) Prior Publication Data
US 2007/0237495 A1    Oct. 11, 2007

(30) Foreign Application Priority Data
Jul. 20, 2004   (JP) ................. 2004-212181

(51) Int. Cl.
*H04N 5/783*    (2006.01)
*H04N 5/08*     (2006.01)
*H04N 5/917*    (2006.01)
*G08B 13/14*    (2006.01)
*H03M 7/00*     (2006.01)
*H04J 3/06*     (2006.01)

(52) U.S. Cl.
USPC ..... 386/343; 386/355; 340/572.4; 340/572.7; 341/61; 348/525; 348/533; 370/503

(58) Field of Classification Search
USPC ............. 386/343, 355, E5.052; 341/61; 370/413, 278, 329, 352, 354, 503; 379/88.14, 88.22; 704/207, 217, 503; 704/E21.017; G9B/20.014, 27.002, 27.019, G9B/27.029; 340/505, 572.4, 572.7, E10.31, 340/E10.4, E10.41, E10.5; 343/878; 348/525, 533, E5.017, 32, 130, E5.085, 348/E7.085; 375/259, 260; 709/224
See application file for complete search history.

(56) References Cited

U.S. PATENT DOCUMENTS 3,987,241 A * 10/1976 Lloyd et al. ............... 348/130
4,631,746 A * 12/1986 Bergeron et al. ........... 704/217
(Continued)

FOREIGN PATENT DOCUMENTS

JP   2002-77233    3/2002
JP   2002-330180   11/2002
(Continued)

OTHER PUBLICATIONS

E. Steinbach, et al., "Adaptive Playout for Low Latency Video Streaming," 2001 international Conference on Image Processing, IEEE, New York, NY, vol. 1, Oct. 7, 2001, pp. 962-965.
(Continued)

Primary Examiner — Thai Tran
Assistant Examiner — Syed Hasan
(74) Attorney, Agent, or Firm — Dickinson Wright PLLC

(57) ABSTRACT

There is disclosed a stream data reception/reproduction device capable of suppressing deterioration of quality of stream data reproduced even when the stream data is received via an IP network or the like in which the packet arrival timing and the order are not guaranteed. In this device, a reproduction speed control unit (107) sets various conditions in accordance with the value of the synchronization difference reported from a synchronization difference calculation unit (102). Only when the set conditions are satisfied, the speed of reproduction of a frame decompressed and inputted from a decoding unit (105) is adjusted. The reproduction speed control unit (107) interpolates a predetermined amount of sample data into the frame or decimates it from the frame when adjusting the reproduction speed.

17 Claims, 3 Drawing Sheets

(56) References Cited

U.S. PATENT DOCUMENTS

| | | | |
|---|---|---|---|
| 5,815,213 A * | 9/1998 | Meunier | 348/533 |
| 5,952,922 A * | 9/1999 | Shober | 340/572.4 |
| 6,222,909 B1 * | 4/2001 | Qua et al. | 379/88.22 |
| 6,671,325 B2 * | 12/2003 | Lee et al. | 375/259 |
| 7,266,127 B2 * | 9/2007 | Gupta et al. | 370/413 |
| 8,331,269 B2 * | 12/2012 | Li et al. | 370/278 |
| 2001/0038646 A1 * | 11/2001 | Van Der Putten et al. | 370/503 |
| 2002/0026310 A1 | 2/2002 | Mochida et al. | |
| 2002/0101368 A1 * | 8/2002 | Choi et al. | 341/61 |
| 2005/0207733 A1 * | 9/2005 | Gargi | 386/68 |

FOREIGN PATENT DOCUMENTS

| | | |
|---|---|---|
| JP | 2003-87317 | 3/2003 |
| JP | 2004-158925 | 6/2004 |
| WO | 03/048900 | 6/2003 |

OTHER PUBLICATIONS

International Search Report dated Oct. 25, 2005.
Supplementary European Search Report dated Apr. 6, 2009.

* cited by examiner

STREAM DATA RECEPTION/REPRODUCTION DEVICE AND STREAM DATA RECEPTION/REPRODUCTION METHOD

TECHNICAL FIELD

The present invention relates to an apparatus for receiving stream data such as audio stream and video stream, via a network and performing playback.

BACKGROUND ART

In recent years, products using a VoIP (Speech over IP) technique that transfers speech data using an IP (Internet Protocol) network and enables communication, are put in practical use. In the VoIP technique, a transmission side communication terminal apparatus A/D (analog/digital) converts input speech to generate digital data, and packetizes the generated digital data per predetermined amount of data, and transmits the result to a network such as the Internet. In the VoIP technique, the transmission side communication terminal apparatus may compress and encode digital data before packetizing. Incidentally, the individual digital data divided for packetizing is referred to as a frame, and the frame to which header information indicating the type, destination, and the like of the data is attached is referred to as a packet. On the other hand, in the VoIP technique, the receiving side communication terminal apparatus cannot predict a packet arrival timing and the order, and therefore, in order to absorb the fluctuation in the timing and the changes of order, by temporarily storing the received packet in a buffer, extracting the packet from this buffer in a predetermined cycle, and carrying out D/A (digital/analog) conversion or the like, speech is played back.

Moreover, in the VoIP technique, RTP (Real-time Transport Protocol) may be adopted. The packet based on RTP has a time stamp field in the header. The receiving side communication terminal apparatus knows the order and timing for playing back the frame using the time stamp in the received packet.

Here, in the IP network, a single clock which all nodes use as a reference does not exist, each node results in operating using each internal clock as a reference. There are originally individual differences in the internal clock generating apparatuses, and the operation of the apparatuses is influenced by a change in the operating environment such as temperature, and therefore it is rare that the internal clocks are completely in synchronization between different nodes. Therefore, unless the internal clock of the transmission side communication terminal apparatus is synchronized with the internal clock of the receiving side communication terminal apparatus, instantaneous deterioration of speech quality such as a break or a sound skipping during a call, is most likely to occur at the receiving side communication terminal apparatus in accordance with an increase in the duration of a call. For example, when a frequency of the internal clock of the transmission side communication terminal apparatus is lower than a frequency of the internal clock of the receiving side communication terminal apparatus, if it is assumed that, at the receiving side communication terminal apparatus, a fixed amount of received packets is periodically extracted from a buffer, the stored amount of packets in the buffer decreases gradually. Accordingly, the buffer will be empty sooner or later and the speech playback will be interrupted. On the other hand, when the frequency of the internal clock of the transmission side communication terminal apparatus is higher than the frequency of the internal clock of the receiving side communication terminal apparatus, if it is assumed that, at the receiving side communication terminal apparatus, a fixed amount of received packets is periodically extracted from the buffer, the stored amount of packets in the buffer increases gradually. Accordingly, the packet will overflow from the buffer sooner or later and be discarded, and therefore an instantaneous sound skipping will occur sporadically. Here, if it is assumed that the buffer capacity is unlimited, the sound skipping will not occur, but a delay in the played back speech increases gradually in accordance with the elapse of the duration of a call, so that the call lacks real time characteristics.

Then, conventionally, techniques have been devised that prevent a break or a sound skipping in the speech playback from occurring in the receiving side communication terminal apparatus which receives stream data via a network. For example, a technique is listed that dynamically adjusts the frequency of the internal clock of the receiving side communication terminal apparatus using the internal clock of the transmission side communication terminal apparatus as a reference, or a technique that detects a difference from the internal clock of the transmission side communication terminal apparatus at the receiving side communication terminal apparatus, and interpolates data corresponding to the detected difference to the received packet or decimates data corresponding to the detected difference from the received packet (for example, see Patent Document 1). In addition, when these two types of techniques are compared, the technique according to Patent Document 1 of interpolating or decimating data can suppress the circuit scale, and therefore is advantageous in terms of the portability of the receiving side communication terminal apparatus, the manufacturing cost and the like.

FIG. 1 is a block diagram showing a configuration of a communication system described in Patent Document 1. This communication system has transmission apparatus 10, input section 11, transmission side amplification section 12, receiving apparatus 20, receiving side amplifier 31, output section 32 and network 50. Transmission apparatus 10 has A/D converter 13, input buffer 14, encoding section 15, transmission buffer 16 and transmission section 17. Input section 11 converts inputted speech into an analog speech signal, and inputs the converted analog speech signal to amplifier 12. Amplifier 12 amplifies the analog speech signal inputted from input section 11, and inputs the amplified analog speech signal to A/D converter 13 in transmission apparatus 10. A/D converter 13 converts the analog speech signal inputted from amplifier 12 into digital speech data, and inputs the digital speech data after conversion to input buffer 14. Input buffer 14 stores the digital speech data inputted from A/D converter 13 and periodically inputs the stored digital speech data into encoding section 15. Encoding section 15 converts the digital speech data inputted from input buffer 14, into compressed speech encoding information, and inputs the compressed speech encoding information after conversion to transmission buffer 16. Transmission buffer 16 stores the compressed speech encoding information inputted from encoding section 15, and periodically inputs the stored compressed speech encoding information into transmission section 17. Transmission section 17 packetizes the compressed speech encoding information inputted from transmission buffer 16, and sequentially sends out this packet onto network 50.

Receiving apparatus 20 has receiving section 21, receiving buffer 22, decoding section 23, playback speed judgment section 24, speed buffer 25, playback speed control section 26, output buffer 27 and D/A converter 28. Receiving apparatus 21 receives the compressed speech encoding information sent out from transmission apparatus 10 via network 50, and sequentially inputs the received compressed speech encoding information to receiving buffer 22. Receiving buffer 22 stores the compressed speech encoding information inputted from receiving section 21, and periodically inputs the stored compressed speech encoding information to decoding section 23 using the internal clock in receiving apparatus as a reference. Decoding section 23 decompresses the compressed speech encoding information periodically inputted from receiving buffer 22 using the internal clock as a reference to digital speech data, and inputs this digital speech data to output buffer 27. Playback speed judgment section 24 monitors the stored amount of the compressed speech encoding information in receiving buffer 22, and determines the playback speed of speech according to the changes in the stored amount, and reports the determined playback speed to speed buffer 25. Speed buffer 25 stores the playback speed reported from playback speed judgment section 24 in time series, and sequentially reports the stored playback speed to playback speed control section 26. Playback speed control section 26 controls output buffer 27 so that a data amount of the digital speech data inputted to D/A converter 28 per unit of time—the playback speed of the speech in output section 32—may be equal to the playback speed reported from speed buffer 25. Output buffer 27 stores the digital speech data inputted from decoding section 23, and, after interpolating or decimating speech sample data with respect to the stored digital speech data under the control of playback speed control section 26, output buffer 27 inputs this digital speech data to D/A converter 28. In addition, output buffer 27 interpolates or decimates the speech sample data with respect to the stored digital speech data, and thereby the playback speed of speech in output section 32 is adjusted. D/A converter 28 converts the digital speech data inputted from output buffer 27 into an analog speech signal, and inputs the analog speech signal after conversion to amplifier 31. Amplifier 31 amplifies the analog speech signal inputted from D/A converter 28 and inputs the analog speech signal after amplification to output section 32. Output section 32 outputs the analog speech signal inputted from amplifier 31 as speech.

Moreover, receiving apparatus 20 detects a difference in the sound volume component values between given digital speech data and the immediately preceding digital speech data, and, only when the difference is small, the speech playback speed is adjusted according to the increase and decrease in the stored amount of digital speech data in receiving buffer 22. That is, receiving apparatus 20 does not adjust the speech playback speed when the sound volume of speech to be played back is large, but adjusts the speech playback speed to suppress deterioration of speech quality only when the sound volume of speech to be played back is small.

Patent Document 1: Japanese Patent Application Laid-Open No. 2002-330180

DISCLOSURE OF INVENTION

Problems to be Solved by the Invention

However, with the technique described in Patent Document 1, when the sound volume of speech to be played back is large, the speech playback speed is not adjusted, and therefore, a break, a sound skipping or the like will occur in the speech to be played back. Therefore, there is a problem that it is not possible to suppress the deterioration of speech quality sporadically occurring upon the playback of the speech.

Further, with the technique described in Patent Document 1, the speech playback speed is adjusted paying attention to the increase and decrease in the stored amount of digital speech data in receiving buffer 22, and therefore, it is considered that this technique cannot be adapted to the case where a packet does not arrive at receiving apparatus 20, or the case where the packet arrives in a significant delay. Accordingly, if the technique described in Patent Document 1 is used in an IP network or the like in which the packet arrival timing, the order and the packet arrival are not guaranteed, the preconditions for achieving the advantages by this technique are not satisfied, thereby causing a problem that the speech quality upon the playback deteriorates more.

It is therefore an object of the present invention to provide a stream data reception/playback apparatus and stream data reception/playback method capable of suppressing deterioration of speech quality in playing back stream data even if the stream data is received via an IP network or the like in which the packet arrival timing and the order are not guaranteed.

Means for Solving the Problem

The stream data reception/playback apparatus according to the present invention has: a reception section that receives packetized stream data; a receiving buffer that stores frames of the received stream data; a frame detection section that detects a frame to be played back from a frame group in the stored stream data; and a playback speed control section that adjusts playback speed of the stream data when the frame to be played back is not detected by the frame detection section.

Advantageous Effect of the Invention

According to the present invention, when the frame to be played back is not detected by the frame detection section, the playback speed control section adjusts the playback speed of the stream data, so that it is possible to reduce a frequency at which the quality deterioration of the stream data such as a sound skipping occurs upon the playback of the stream data, and suppress the quality deterioration caused by interpolating and decimating data with respect to the received stream data.

BEST MODE FOR CARRYING OUT THE INVENTION

Hereinafter, embodiments of the present invention will be described in detail with reference to the accompanying drawings.

Embodiment 1

Figure 1:
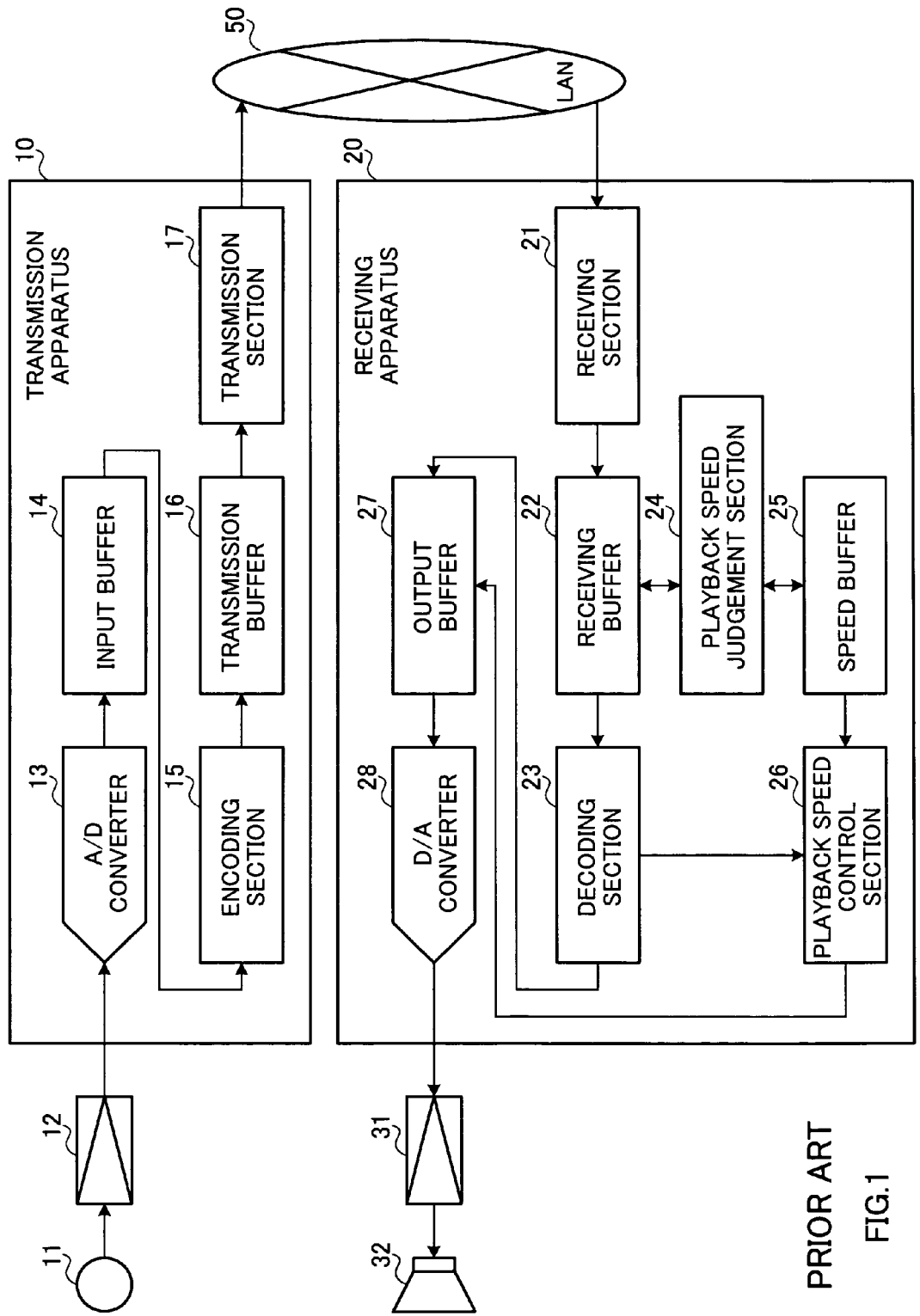
FIG. 1 is a block diagram showing a configuration of a conventional communication system.
Figure 2:
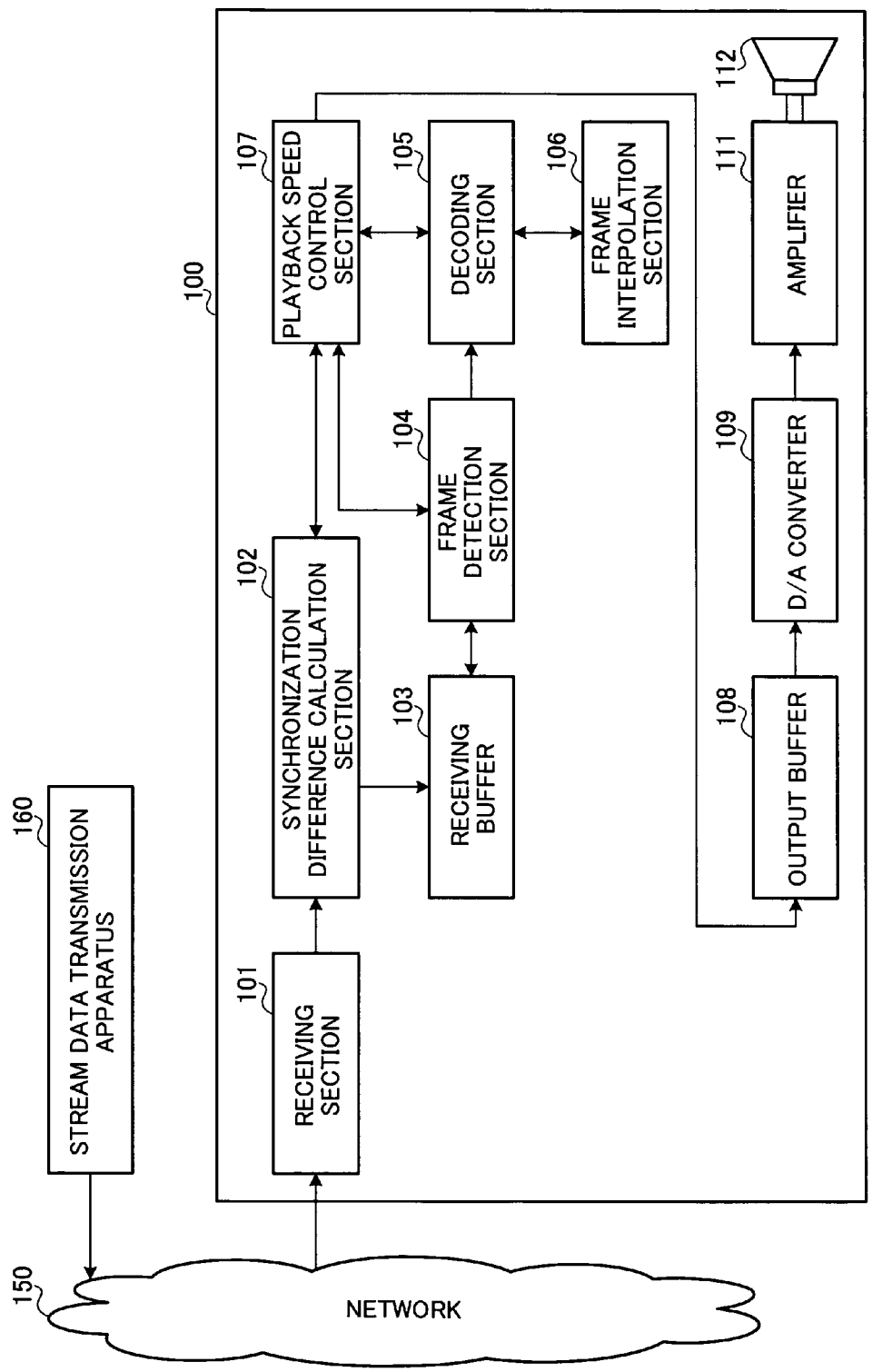
FIG. 2 is a block diagram showing a configuration of a communication system according to Embodiment 1.

FIG. 2 is a block diagram showing the configuration of the communication system including stream data reception/playback apparatus 100 according to Embodiment 1 of the present invention. This communication system includes stream data reception/playback apparatus 100, networks 150 such as the Internet, and stream data transmission apparatus 160. Moreover, in this communication system, it is assumed that the function to allow an accurate synchronization between nodes is not provided, so that stream data reception/playback apparatus 100 and stream data transmission apparatus 160 operate using the independent internal clocks as references.

Stream data transmission apparatus 160 extracts a predetermined amount of stream data in time series, packetizes the data, and sequentially transmits this packet onto network 150 toward stream data reception/playback apparatus 100. In addition, it is assumed that in packetizing this stream data, RTP is used, and a time stamp that is an indicator of the playback time is attached to each frame.

Stream data reception/playback apparatus 100 has: receiving section 101, synchronization difference calculation section 102, receiving buffer 103, frame detection section 104, decoding section 105, frame interpolation section 106, playback speed control section 107, output buffer 108, D/A converter 109, amplifier 111 and output section 112.

Receiving section 101 receives packetized stream data transmitted by stream data transmission apparatus 160 via network 150, and sequentially inputs the received packet to synchronization difference calculation section 102.

After extracting a time stamp from the packet sequentially inputted from receiving section 101, synchronization difference calculation section 102 inputs the extracted time stamp and the frame of the packet to receiving buffer 103 each time. Moreover, synchronization difference calculation section 102 periodically calculates a difference between the internal clock of stream data transmission apparatus 160 and the internal clock of stream data reception/playback apparatus 100—a synchronization difference—using the extracted time stamp as described later. In addition, the packet arrival is not guaranteed and is irregular if the packet is received via network 150 according to the VoIP technique, and therefore synchronization difference calculation section 102 does not calculate the synchronization difference every time a packet is inputted from receiving section 101 in order to remove the influence and stably calculate a synchronization difference. Then, synchronization difference calculation section 102 reports the scale of the calculated synchronization difference to playback speed control section 107.

Receiving buffer 103 stores a predetermined amount of frames inputted from synchronization difference calculation section 102 and the time stamps attached to these frames, and the frames are arranged in time series using the stored time stamps as references, and in response to a request from the frame detection section 104 described later, a frame corresponding to a predetermined time stamp is inputted to frame detection section 104.

Here, receiving section 101, synchronization difference calculation section 102 and receiving buffer 103 will operate using the reception of a packet from network 150 as a trigger, and therefore will operate independently of the internal clock of stream data reception/playback apparatus 100. On the other hand, each component from frame detection section 104 to output section 112 described later operates based on the internal clock of stream data reception/playback apparatus 100. Accordingly, the processing of the stream data at stream data reception/playback apparatus 100 is mainly divided into "reception processing" by receiving section 101, synchronization difference calculation section 102 and receiving buffer 103, and "playback processing" by components from frame detection section 104 to output section 112, and the reception processing and playback processing will be carried out based on the different clocks. Moreover, it is possible to carry out these reception processing and playback processing in stream data reception/playback apparatus 100 independently at least conceptually, like the multi-thread processing.

Frame detection section 104 searches receiving buffer 103 whether a time stamp, which is supposed to be attached to a frame to be played back, is stored, based on the internal clock of stream data reception/playback apparatus 100. If the target time stamp is stored in receiving buffer 103 as a result of search, frame detection section 104 reports to playback speed control section 107 that the target frame is detected, requests receiving buffer 103 to output this frame, and inputs the frame inputted from receiving buffer 103 to decoding section 105. On the other hand, if the target time stamp is not stored in receiving buffer 103 as a result of search, frame detection section 104 reports to playback speed control section 107 and decoding section 105 that the frame is not detected. In addition, immediately after stream data reception/playback apparatus 100 starts reception, frame detection section 104 carries out temporarily standby until a predetermined amount of frames is stored in receiving buffer 103, and will not search in receiving buffer 103. Frame detection section 104 carries out temporarily standby in order to allow the continuous playback of the stream data in output section 112 regardless of the reception conditions of packets in receiving section 101. Moreover, the function to carry out such temporary standby is generally referred to as "fluctuation absorption buffer." Moreover, when such temporary standby is carried out, it is possible to use the number of frames stored in receiving buffer 103 as a reference, instead of time.

When a frame is inputted from frame detection section 104, decoding section 105 decodes (decompresses) the frame and sequentially inputs the decompressed frame to playback speed control section 107. Moreover, when frame detection section 104 reports that the target frame is not detected, decoding section 105 extracts a predetermined frame from frame interpolation section 106, and decompresses the extracted frame and inputs the result to playback speed control section 107.

Frame interpolation section 106 provides the stored frame to decoding section 105 in response to a request from decoding section 105. In addition, frame interpolation section 106 may store a predetermined sample data instead of a frame, and in this case decoding section 105 will input the sample data to playback speed control section 107 as is.

Playback speed control section 107 sets various conditions described later, according to the scale of the synchronization difference which is reported from synchronization difference calculation section 102, and adjusts the playback speed regarding the decompressed frame inputted from decoding section 105, only if these set conditions are satisfied. Moreover, playback speed control section 107 sequentially inputs the frame in which the playback speed is adjusted to output buffer 108 as necessary. In addition, a specific embodiment of the adjustment of the playback speed of stream data in playback speed control section 107 will be described later.

Output buffer 108 sequentially stores the frame inputted from playback speed control section 107, and periodically inputs the frame to D/A converter 109 in the stored order using the internal clock of stream data reception/playback apparatus 100 as a reference.

D/A converter 109 converts the frame inputted from output buffer 108 into an analog signal, and inputs the analog signal after conversion to amplifier 111.

Amplifier 111 amplifies the analog signal inputted from D/A converter 109 to a predetermined power level and inputs the amplified analog signal to output section 112.

Output section 112 outputs the analog signal inputted from amplifier 111 as speech.

Next, the operation of stream data reception/playback apparatus 100 will be described focusing on the relationship among playback speed control section 107, synchronization difference calculation section 102 and frame detection section 104.

First, in synchronization difference calculation section 102, based on the time stamp extracted from the packet, a difference between the internal clock of stream data transmission apparatus 160 and the internal clock of stream data reception/playback apparatus 100—a synchronization difference—is calculated using the following equation. In addition, the meaning of the variables in this equation is summarized in "Table 1" below.

$$D = \sum_{k=n}^{n+N-1} (t_k - T_k) + D_{pre} + r \quad \text{[Equation 1]}$$

TABLE 1

| Variable | Meaning |
| --- | --- |
| D | Scale of synchronization difference |
| T | Time when a frame is supposed to arrive (Measured arrival time of the preceding frame) + (Time corresponding to the difference between time stamps of the current frame and preceding frame) |
| t | Measured arrival time of the current frame |
| N | Determining period (number of frames) |
| Dpre | Calculation value of the previous D |
| r | Correction value (to be reset to zero after calculation of D, in case of non-zero) |

In Table 1, a frame which is a calculation target of D is expressed as "current frame," and also a frame which arrives immediately before the current frame is expressed as "preceding frame." Moreover, "measured arrival time" in Table 1 means a time which is measured using the internal clock of stream data reception/playback apparatus 100 as a reference. Moreover, the meaning of "correction value" in Table 1 will be described later.

If the value of D calculated from this equation is positive, it means that the internal clock of stream data reception/playback apparatus 100 is faster than the internal clock of stream data transmission apparatus 160, in other words, the frequency of the internal clock of stream data reception/playback apparatus 100 is high. On the other hand, if the value of this D is negative, it means that the internal clock of stream data reception/playback apparatus 100 is slower than the internal clock of stream data transmission apparatus 160, in other words, the frequency of the internal clock of stream data reception/playback apparatus 100 is low.

If the scale (absolute value) of the synchronization difference reported from synchronization difference calculation section 102, is larger than or equal to a first threshold value, playback speed control section 107 adjusts the playback speed of the frame inputted from decoding section 105 considering the detection result of a frame reported from frame detection section 104, specifically in accordance with the control policy shown in "Table 2" below.

TABLE 2

| Synchronization difference (D) | Correction conditions | Correction mode |
| --- | --- | --- |
| x <= D | Non-detection of a frame | x interpolation |
| | Detection of a frame | — |
| −x < D < x | — | — |
| D <= −x | Non-detection of a frame | x decimation |
| | Detection of a frame | — |

In Table 2, "x" is a positive value corresponding to the first threshold value. As shown in Table 2, when synchronization difference D satisfies "−x<D<x", playback speed control section 107 inputs a frame inputted from decoding section 105 to output buffer 108 as is, regardless of the detection result of the frame reported from frame detection section 104.

Moreover, when synchronization difference D satisfies "x≤D", only when it is reported from frame detection section 104 that a frame to be played back cannot be detected, playback speed control section 107 interpolates a sample data corresponding to time x with respect to the frame inputted from decoding section 105, and inputs this frame to which this sample data is interpolated to output buffer 108. Moreover, at the same time, playback speed control section 107 instructs frame detection section 104 to delay the next search start time by time x and also instructs synchronization difference calculation section 102 to use the negative value of x—"−x"—as correction value r in the above-described equation for calculating D. In addition, even if frame detection section 104 delays the next search start time by time x in accordance with the instruction from playback speed control section 107, sample data corresponding to this time x is interpolated by the frame in playback speed control section 107, and therefore the stored amount of frames in output buffer 108 will be stable.

On the other hand, when synchronization difference D satisfies "x≤D", if it is reported from frame detection section 104 that a frame to be played back is detected, playback speed control section 107 inputs the frame inputted from decoding section 105, to output buffer 108 as is.

Moreover, when synchronization difference D satisfies "D≤−x", only when it is reported from frame detection section 104 that a frame to be played back cannot be detected, playback speed control section 107 decimates data corresponding to time x from the frame inputted from decoding section 105, and inputs the frame in which the decimation is carried out, to output buffer 108. Moreover, at the same time, playback speed control section 107 instructs frame detection section 104 to expedite the next search start time by time x and also instructs synchronization difference calculation section 102 to use "x" as correction value r in the above-described equation for calculating D. In addition, even if frame detection section 104 expedite the next search start time by time x in accordance with the instruction from playback speed control section 107, sample data corresponding to this time x is decimated in playback speed control section 107, and therefore the stored amount of the frame in output buffer 108 will be stable.

On the other hand, when synchronization difference D satisfies "D≤−x", if it is reported from frame detection section 104 that a frame to be played back is detected, playback speed control section 107 inputs the frame inputted from decoding section 105, to output buffer 108 as is.

That is, in stream data reception/playback apparatus 100, when playback speed control section 107 adjusts the playback speed of the stream data, playback speed control section 107 interpolates sample data to the frame, and frame detection section 104 performs control so that the next search start time is delayed by a predetermined time, or playback speed control section 107 decimates a predetermined amount of data from the frame, and frame detection section 104 performs control so that the next search start time is expedited.

Here, the stream data reception/playback apparatus according to this embodiment may be described as follows. "A stream data reception/playback apparatus for receiving packetized stream data transmitted by a transmission apparatus, via a network and performing playback, the stream data reception/playback apparatus having: a receiving section that receives the packetized stream data; a synchronization difference calculation section that calculates a difference between an internal clock of the transmission apparatus and an internal clock of a reception apparatus from the received packetized stream data; a receiving buffer that stores a frame of the received packetized stream data; a frame detection section that detects a frame to be played back from a frame group stored in the receiving buffer; and a playback speed control section that adjusts the playback speed of the stream data if an absolute value of the difference of the internal clock calculated by the synchronization difference calculation section is larger than or equal to first threshold value x and the frame to be played back is not detected by the frame detection section."

In this way, according to stream data reception/playback apparatus 100 of this embodiment, only when the scale (absolute value) of synchronization difference D calculated by synchronization difference calculation section 102 is larger than or equal to first threshold value x and the frame to be played back is not detected by frame detection section 104, playback speed control section 107 interpolates a predetermined amount of sample data to the frame or decimates a predetermined amount of sample data from the frame, so that it is possible to reduce the frequency at which the quality deterioration due to a sound skipping or the like of the stream data caused by the synchronization difference occurs and suppress the quality deterioration caused by the interpolation of sample data and the decimation of the data from the frame for correcting the synchronization difference.

Moreover, according to stream data reception/playback apparatus 100 of the present invention, synchronization difference calculation section 102 calculates synchronization difference D from the time stamp which the packetized stream data has, and therefore, even if network 150 is the Internet or the like, it is possible to reduce the frequency at which the quality deterioration occurs upon playback of the stream data and suppress the quality deterioration caused by the interpolation of sample data or the decimation of the data from the frame.

In addition, in the correction mode of the control policy shown in Table 2, a case has been described in which, when playback speed control section 107 adjusts the playback speed of the stream data, both the amount of sample data to be interpolated and the amount of data to be decimated from the frame are fixed to the data amount corresponding to first threshold value x, however, the present invention is not limited to this, and, for example, the amount of sample data to be interpolated or the amount of data to be decimated from the frame may not be the same as the threshold value used in synchronization difference calculation section 102.

Moreover, in this embodiment, a case has been described in which positive first threshold value x and its negative value "−x" are used as a reference for determining whether playback speed control section 107 adjusts the playback speed of the stream data, however, the present invention is not limited to this, and, for example, playback speed control section 107 may use threshold values which differ between the positive value and negative value as references.

Embodiment 2

In Embodiment 2 according to the present invention, stream data reception/playback apparatus 100 operates in accordance with the control policy shown in "Table 3" below. That is, in this embodiment, the operations of playback speed control section 107, synchronization difference calculation section 102 and frame detection section 104 differ from the operations in Embodiment 1.

TABLE 3

| Synchronization difference (D) | Correction conditions | Correction mode |
|---|---|---|
| $y \leq D$ | — | y interpolation |
| $x \leq D < y$ | Non-detection of a frame | x interpolation |
| | Detection of a frame | — |
| $-x < D < x$ | — | — |
| $-y < D \leq -x$ | Non-detection of a frame | x decimation |
| | Detection of a frame | — |
| $D \leq -y$ | — | y decimation |

Hereinafter, regarding the operation of stream data reception/playback apparatus 100 in this embodiment, only the points that differ from Embodiment 1 will be described specifically.

In Table 3, "y" is a positive value corresponding to a second threshold value. As shown in Table 3, when synchronization difference D satisfies "$x \leq D < y$", stream data reception/playback apparatus 100 carries out the same operation as in the case where synchronization difference D satisfies "$x \leq D$" in Embodiment 1. Moreover, when synchronization difference D satisfies "$-y < D \leq -x$", stream data reception/playback apparatus 100 carries out the same operation as in the case where synchronization difference D satisfies "$D \leq -x$" in Embodiment 1.

Moreover, as shown in Table 3, when synchronization difference D satisfies "$y \leq D$", playback speed control section 107 interpolates sample data corresponding to time y to the frame inputted from decoding section 105, regardless of the instruction from frame detection section 104, and inputs a frame to which this sample data is interpolated to output buffer 108. Moreover, at the same time, playback speed control section 107 instructs frame detection section 104 to delay the next search start time by time y and also instructs synchronization difference calculation section 102 to use a negative value of y—"−y"—as correction value r in the above-described equation for calculating D.

On the other hand, when synchronization difference D satisfies "$D \leq -y$" as shown in Table 3, playback speed control section 107 decimates data corresponding to time y from the frame inputted from decoding section 105, regardless of the instruction from frame detection section 104, and inputs a frame to which the decimation is carried out to output buffer 108. Moreover, at the same time, playback speed control section 107 instructs frame detection section 104 to expedite the next search start time by time y and also instructs synchronization difference calculation section 102 to use "y" as correction value r in the above-described equation for calculating D.

Here, the stream data reception/playback apparatus according to this embodiment can be described as follows. "The stream data reception/playback apparatus according to Embodiment 1, wherein the playback speed control section adjusts the playback speed of the stream data; if an absolute value of a difference of the internal clocks calculated by the synchronization difference calculation section is larger than or equal to first threshold value x and is smaller than second threshold value y, and a frame to be played back is not detected by the frame detection section; or if the absolute value of the difference of the internal clocks calculated by the synchronization difference calculation section is larger than or equal to second threshold value y."

In this way, in Embodiment 2, second threshold value y which is larger than first threshold value x is adopted, and if the scale (absolute value) of synchronization difference D is larger than or equal to second threshold value y, playback speed control section 107 interpolates data corresponding to time y to the frame or decimates the data from the frame regardless of the report from frame detection section 104, so that it is possible to further suppress the fluctuation of the stored amount of stream data in output buffer 108.

Moreover, according to stream data reception/playback apparatus 100 of this embodiment, the conditions and mode for correcting the playback speed of the received stream data may be set individually according to the scale of synchronization difference D, so that by further reducing the possibility that the underflow or overflow of the stream data occurs according to the actual receiving conditions of the stream data, it is possible to effectively suppress the quality deterioration upon the playback.

In addition, the amount of sample data to be interpolated to a frame or the amount of data to be decimated from a frame in playback speed control section 107 may not be the same as the threshold value used in synchronization difference calculation section 102.

Moreover, in this embodiment, a case has been described in which positive value x or y and the negative value "−x" or "−y" are used as references for determining whether playback speed control section 107 adjusts the playback speed of the stream data, however, the present invention is not limited to this, and, for example, playback speed control section 107 may use values which differ between the positive value and negative value as references.

Embodiment 3

In Embodiment 3 according to the present invention, stream data reception/playback apparatus 100 operates in accordance with the control policy shown in "Table 4" below. That is, in this embodiment, the operations of playback speed control section 107, synchronization difference calculation section 102 and frame detection section 104 differ from the operations in Embodiment 1.

TABLE 4

| Synchronization difference (D) | Correction conditions | Correction mode |
|---|---|---|
| y <= D | — | y interpolation |
| z <= D < y | Non-detection of a frame or detection of a silence frame | z interpolation |
|  | Detection of a frame and non-detection of a silence frame | — |
| x <= D < z | Non-detection of a frame | x interpolation |
|  | Detection of a frame | — |
| −x < D < x | — | — |
| −z < D <= −x | Non-detection of a frame | x decimation |
|  | Detection of a frame | — |
| −y <= D <= −z | Non-detection of a frame or detection of a silence frame | z decimation |
|  | Detection of a frame and non-detection of a silence frame | — |
| D <= −y | — | y decimation |

As is clear from the comparison of Table 3 and Table 4, in this embodiment, a positive value "z" corresponding to a third threshold value is newly adopted between first threshold value x and second threshold value y which are adopted in Embodiment 2. For this reason, the operation of stream data reception/playback apparatus 100 in this embodiment and the operation of stream data reception/playback apparatus 100 described in Embodiment 2 have a lot in common. Then, in this embodiment, in order to avoid the duplicate description, only the operation which differs from the operation of stream data reception/playback apparatus 100 described in Embodiment 2 will be described.

In addition, in this embodiment, it is assumed that the stream data is speech data, and to each frame, there is attached information which distinguishes a voiced interval from a silence interval using the power level as a reference upon encoding in stream data transmission apparatus 160. Then, this information which distinguishes a voiced interval from a silence interval is extracted by frame detection section 104, and it is determined whether or not this frame corresponds to a silence interval. Accordingly, in this embodiment, frame detection section 104 reports the judgment result of whether or not the frame corresponds to a "silence frame" and the detection result of a frame to be played back to playback speed control section 107.

In this embodiment, when synchronization difference D satisfies "z≤D<y" as shown in Table 4, only when it is reported from frame detection section 104 that the frame to be played back cannot be detected, or when it is reported that a silence frame is detected, playback speed control section 107 interpolates sample data corresponding to time z to the frame inputted from decoding section 105, and inputs a frame to which this sample data is interpolated to output buffer 108. Moreover, at the same time, playback speed control section 107 instructs frame detection section 104 to delay the next search start time by time z and also instructs synchronization difference calculation section 102 to use a negative value of z—"−z"—as correction value r in the above-described equation for calculating D.

On the other hand, when synchronization difference D satisfies "z≤D<y", if it is reported from frame detection section 104 that a frame to be played back is detected and a silence frame cannot be detected, playback speed control section 107 inputs the frame inputted from decoding section 105, to output buffer 108 as is.

Moreover, when synchronization difference D satisfies "−y<D≤−z", only when it is reported from frame detection section 104 that a frame to be played back cannot be detected, or when it is reported that a silence frame is detected, playback speed control section 107 decimates data corresponding to time z, from the frame inputted from decoding section 105, and inputs the frame to which the decimation is carried out to output buffer 108. Moreover, at the same time, playback speed control section 107 instructs frame detection section 104 to expedite the next search start time by time z and also instructs synchronization difference calculation section 102 to use "z" as correction value r in the above-described equation for calculating D.

On the other hand, when synchronization difference D satisfies "−y<D≤−z", if it is reported from frame detection section 104 that a frame to be played back is detected and a silence frame cannot be detected, playback speed control section 107 inputs the frame inputted from decoding section 105, to output buffer 108 as is.

Here, the stream data reception/playback apparatus according to this embodiment can be described as follows. "The stream data reception/playback apparatus according to Embodiment 2, wherein the playback speed control section adjusts the playback speed of stream data, if an absolute value of the difference of the internal clocks calculated by the synchronization difference calculation section is larger than or equal to first threshold value x and is smaller than third threshold value z which is smaller than second threshold value y, and a frame to be played back is not detected by the frame detection section; or if the absolute value of the difference of the internal clocks calculated by the synchronization difference calculation section is larger than or equal to third threshold value z and is smaller than second threshold value y, and a frame to be played back is not detected by the frame detection section or the detected frame is a silence frame; or if the absolute value of the difference of the internal clocks calculated by the synchronization difference calculation section is larger than or equal to second threshold value y."

In this way, according to stream data reception/playback apparatus 100 of this embodiment, when frame detection section 104 determines that the frame to be played back is a silence frame, the adjustment of the playback speed of speech data is carried out, such as interpolating data corresponding to time z to the frame and decimating data from the frame, so that, by effectively using a characteristic of the silence frame that the sound deterioration resulting from the adjustment of the playback speed cannot be evident, it is possible to further suppress the speech deterioration upon the playback of the speech data.

In addition, the amount of sample data to be interpolated to a frame or the amount of data to be decimated from a frame in playback speed control section 107 may not be the same as the threshold value used in synchronization difference calculation section 102.

Moreover, in this embodiment, a case has been described in which a positive value x, y or z and the negative value "−x", "−y" or "−z" are used as references for determining whether playback speed control section 107 adjusts the playback speed of the stream data, however, the present invention is not limited to this, and, for example, playback speed control section 107 may use the values which differ between the positive value and negative value as references.

Embodiment 4

In Embodiment 4 according to the present invention, stream data reception/playback apparatus 100 operates in accordance with the control policy shown in "Table 5" below. That is, in this embodiment, the operations of playback speed control section 107, synchronization difference calculation section 102 and frame detection section 104 differ from the operations in Embodiment 1.

TABLE 5

| Synchronization difference (D) | Correction conditions | Correction mode |
| --- | --- | --- |
| y <= D | — | y interpolation |
| w <= D < y | Non-detection of a frame, or detection of a silence frame, or detection of a less significant voiced frame | w interpolation |
| | Detection of a frame, and non-detection of a silence frame, and non-detection of a less significant voiced frame | — |
| z <= D < w | Non-detection of a frame or detection of a silence frame | z interpolation |
| | Detection of a frame and non-detection of a silence frame | — |

TABLE 5-continued

| Synchronization difference (D) | Correction conditions | Correction mode |
| --- | --- | --- |
| x <= D < z | Non-detection of a frame | x interpolation |
| | Detection of a frame | — |
| −x < D < x | — | — |
| −z < D <= −x | Non-detection of a frame | x decimation |
| | Detection of a frame | — |
| −w < D <= −z | Non-detection of a frame or detection of a silence frame | z decimation |
| | Detection of a frame and non-detection of a silence frame | — |
| −y < D <= −w | Non-detection of a frame, or detection of a silence frame, or detection of a less significant voiced frame | w decimation |
| | Detection of a frame, and non-detection of a silence frame, and non-detection of a less significant voiced frame | — |
| D <= −y | — | y decimation |

As is clear from comparing Table 4 and Table 5, in this embodiment, a positive value "w" corresponding to a fourth threshold value is newly adopted between third threshold value z and second threshold value y which are adopted in Embodiment 3. For this reason, the operation of stream data reception/playback apparatus 100 in this embodiment and the operation of stream data reception/playback apparatus 100 described in Embodiment 3 have a lot in common. Then, in this embodiment, in order to avoid the duplicate description, only the operation which differs from the operation of stream data reception/playback apparatus 100 described in Embodiment 3 will be described.

In this embodiment, it is assumed that in stream data transmission apparatus 160, a scheme is adopted in which the scale (number of bits) of a frame generated by speech encoding, increases in accordance with the significance of the frame. For this reason, frame detection section 104 is compatible with this speech encoding scheme, and will detect a frame to be played back and measure the number of bits of the detected frame, and report the measured number of bits to playback speed control section 107. Then, playback speed control section 107 compares the number of bits of the frame reported from frame detection section 104 with the fifth threshold value, and, if the number of bits of the frame is smaller than or equal to the fifth threshold value, determines that the frame is a voiced frame of less significance (hereinafter, referred to as a "less significant voiced frame"), and carries out the operation described below.

In this embodiment, as shown in Table 5, when synchronization difference D satisfies "w≤D<y", only when it is reported from frame detection section 104 that a frame to be played back cannot be detected, or it is reported from frame detection section 104 that a silence frame is detected, or it is determined that the frame is a less significant voiced frame, playback speed control section 107 interpolates sample data corresponding to time w to the frame inputted from decoding section 105, and inputs the frame to which this sample data is interpolated to output buffer 108. Moreover, at the same time, playback speed control section 107 instructs frame detection section 104 to delay the next search start time by time w and also instructs synchronization difference calculation section 102 to use a negative value of w—"−w"—as correction value r in the above-described equation for calculating D.

On the other hand, when synchronization difference D satisfies "w≤D<y", if it is reported from frame detection section 104 that a frame to be played back is detected, and a silence frame cannot be detected, and it is determined that the frame is not a less significant voiced frame, playback speed control section 107 inputs the frame inputted from decoding section 105, to output buffer 108 as is.

Moreover, when synchronization difference D satisfies "−y<D≤−w", only when it is reported from frame detection section 104 that a frame to be played back cannot be detected, or when it is reported from frame detection section 104 that a silence frame is detected, or when it is determined that the frame is a less significant voiced frame, playback speed control section 107 decimates data corresponding to time w, from the frame inputted from decoding section 105 and inputs the frame to which the decimation is carried out to output buffer 108. Moreover, at the same time, playback speed control section 107 instructs frame detection section 104 to set forward the next retrieval start time by time w and also instructs synchronization difference calculation section 102 to use "w" as correction value r in the above-described equation for calculating D.

On the other hand, when synchronization difference D satisfies "−y<D≤−w", if it is reported from frame detection section 104 that a frame to be played back is detected, and a silence frame cannot be detected, and it is determined that the frame is not a less significant voiced frame, playback speed control section 107 inputs the frame inputted from decoding section 105, to output buffer 108 as is.

Here, the stream data reception/playback apparatus according to this embodiment can be described as follows. "The stream data reception/playback apparatus according to Embodiment 3, wherein the playback speed control section adjusts playback speed of stream data: if an absolute value of a difference of internal clocks calculated by the synchronization difference calculation section is larger than or equal to first threshold value x and is smaller than third threshold value z which is smaller than second threshold value y, and a frame to be played back is not detected by the frame detection section; or if the absolute value of the difference of the internal clocks calculated by the synchronization difference calculation section is larger than or equal to third threshold value z and is smaller than fourth threshold value w which is smaller than second threshold value y, and a frame to be played back is not detected by the frame detection section or the detected frame is a silence frame; or if the absolute value of the difference of the internal clocks calculated by the synchronization difference calculation section is larger than or equal to fourth threshold value w and is smaller than second threshold value y, and a frame to be played back is not detected by the frame detection section, or the detected frame is a silence frame or the significance of a data to be played back, which is contained in the detected frame, is less than or equal to the fifth threshold value; or if the absolute value of the difference of the internal clocks calculated by the synchronization difference calculation section is larger than or equal to second threshold value y." Moreover, "the stream data reception/playback apparatus, wherein the playback speed control section determines the significance of data to be played back contained in a frame detected by the frame detection section according to the number of bits of the frame, and determines whether the significance of the determined data is less than or equal to the fifth threshold value."

In this way, according to stream data reception/playback apparatus 100 of this embodiment, if playback speed control section 107 determines that a frame to be played back is a less significant voiced frame, an adjustment of the playback speed of a speech data, where data corresponding to time w is interpolated to the frame or is decimated from the frame, is carried out, so that, by effectively using a characteristic of the less significant voiced frame where the sound deterioration resulting from the adjustment of the playback speed is unlikely to be evident, it is possible to effectively suppress the deterioration of the speech quality upon the playback of the speech data.

In addition, the amount of sample data to be interpolated to a frame or the amount of data to be decimated from a frame in playback speed control section 107 may not be the same as the threshold value used in synchronization difference calculation section 102.

Moreover, in this embodiment, a case has been described in which a positive value w, x, y or z and negative value "−w", "−x", "−y" and "−z" are used as references for determining whether playback speed control section 107 adjusts the playback speed of the stream data, however, the present invention is not limited to this, and, for example, playback speed control section 107 may use the values which differ between the positive value and the negative value as references.

In addition, each embodiment in the present invention may be applied or modified as follows.

Figure 3:
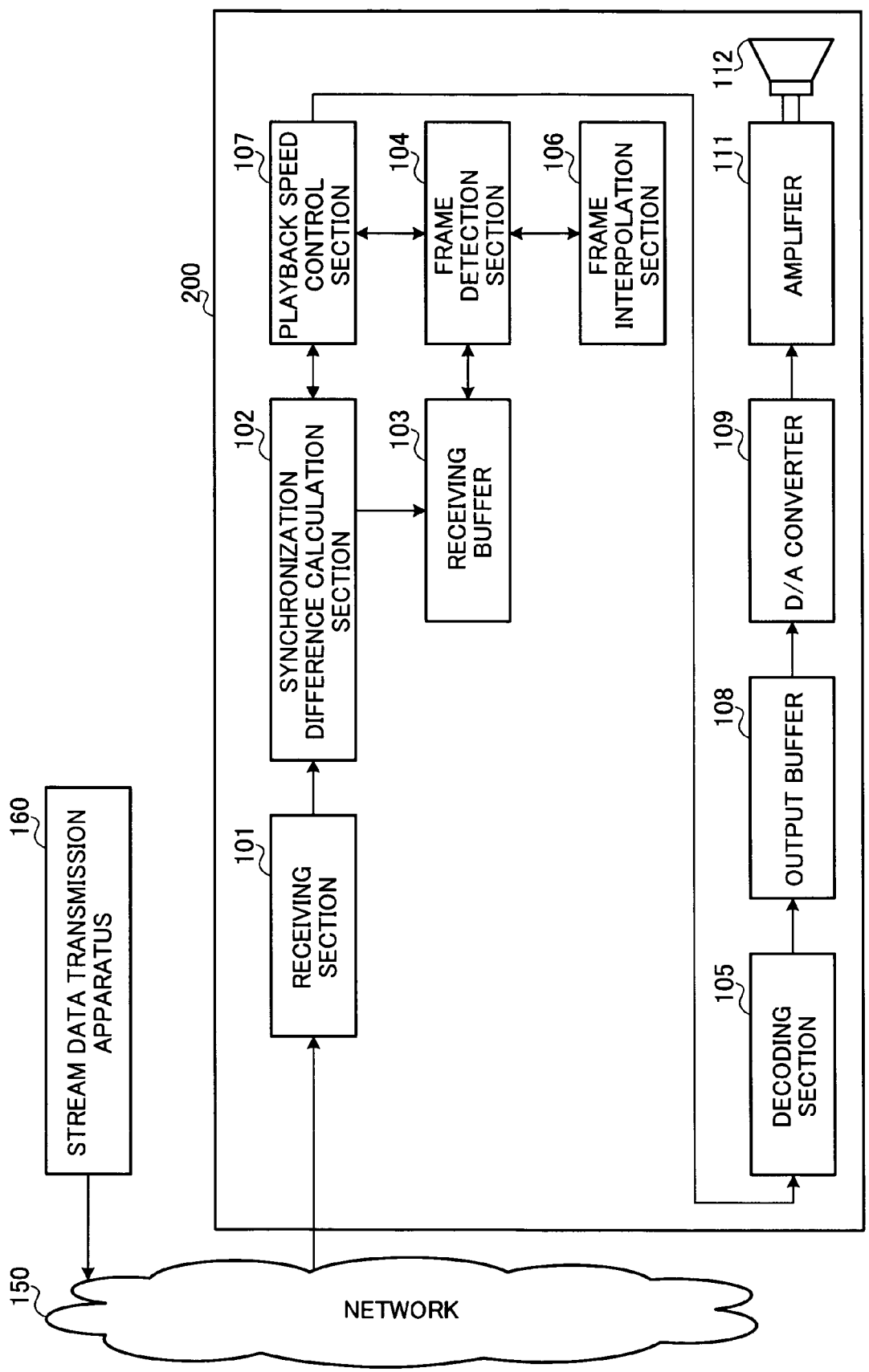
FIG. 3 is a block diagram showing a modification example of the configuration of the communication system in each embodiment.

In the above-described embodiments, in stream data reception/playback apparatus 100, a case has been described in which decoding section 105 is arranged between frame detection section 104 and playback speed control section 107, however, the present invention is not limited to this, and, for example, decoding section 105 may be arranged between playback speed control section 107 and output buffer 108. FIG. 3 shows the configuration of stream data reception/playback apparatus 200 where the position of decoding section 105 is changed. In stream data reception/playback apparatus 200, an adjustment of the playback speed of a stream data in playback speed control section 107 will be changed from adjustment in a unit of data in the frame to adjustment in a unit of frame. Accordingly, according to stream data reception/playback apparatus 200, the load of signal processing in playback speed control section 107 will be reduced.

Moreover, although in the above-described embodiments, the case has been described where network 150 is the Internet or the like, the present invention is not limited to this, and, for example, network 150 may be a LAN (Local-Area Network) or a network for mobile telephones based on a packet switching scheme.

Moreover, the stream data reception/playback apparatus according to the present invention may be mounted in the communication terminal apparatus and base station apparatus in a mobile communication system, so that it is possible to provide the communication terminal apparatus, the base station apparatus and the mobile communication system having the same advantages as the above.

Moreover, here, a case has been described as an example where the present invention is configured with hardware, however, the present invention can be implemented with software. For example, by describing algorithm of the stream data reception/playback method according to the present invention in a programming language, storing this program in a memory and making an information processing section execute this program, it is possible to implement the same function as the stream data reception/playback apparatus of the present invention.

Furthermore, each function block used to explain the above-described embodiments is typically implemented as an LSI constituted by an integrated circuit. These may be individual chips or may partially or totally contained on a single chip.

Furthermore, here, each function block is described as an LSI, but this may also be referred to as "IC", "system LSI", "super LSI", "ultra LSI" depending on differing extents of integration.

Further, the method of circuit integration is not limited to LSI's, and implementation using dedicated circuitry or general purpose processors is also possible. After LSI manufacture, utilization of a programmable FPGA (Field Programmable Gate Array) or a reconfigurable processor in which connections and settings of circuit cells within an LSI can be reconfigured is also possible.

Further, if integrated circuit technology comes out to replace LSI's as a result of the development of semiconductor technology or a derivative other technology, it is naturally also possible to carry out function block integration using this technology. Application in biotechnology is also possible.

The present application is based on Japanese Patent application No. 2004-212181, filed on Jul. 20, 2004, the entire content of which is expressly incorporated by reference herein.

INDUSTRIAL APPLICABILITY

The stream data reception/playback apparatus according to the present invention may advantageously reduce the frequency at which the quality deterioration such as a sound skipping occurs in playing back stream data, and may suppress the quality deterioration in frames caused by the interpolation and decimation of data with respect to the received stream data, and the apparatus is useful for the communication system and the like using a VoIP technique in which the packet arrival is not guaranteed.

The invention claimed is:

1. A stream data reception/playback apparatus, comprising:
   a receiving section that receives packetized stream data;
   a receiving buffer that stores a frame group of the received stream data;
   a frame detection section that is configured to detect whether the frame group of the stored data stream includes a frame to be played back;
   a synchronization difference calculation section that calculates a synchronization difference between an internal clock of a transmitting side and an internal clock of a receiving side from the received data stream; and
   a playback speed control section that adjusts a playback speed of the stream data when the frame detection section does not detect a frame to be played back and an absolute value of the synchronization difference is equal to or greater than a first threshold value, wherein the first threshold is a positive value corresponding to an amount of sample data to be interpolated or decimated by the playback speed control section.

2. The stream data reception/playback apparatus according to claim 1, wherein:
   the frame detection section is configured to detect the frame to be played back from the frame group of the stored stream data and to determine whether the detected frame is a silence frame; and
   the playback speed control section adjusts the playback speed of the stream data when the frame to be played back is not detected in the frame detection section or when the detected frame to be played back is a silence frame.

3. The stream data reception/playback apparatus according to claim 1, wherein:
   the frame detection section is configured to detect the frame to be played back from the frame group of the stored stream data and to determine whether the detected frame is a silence frame or whether significance of the detected frame is less than or equal to a predetermined threshold value; and
   the playback speed control section adjusts the playback speed of the stream data, when the frame to be played hack is not detected in the frame detection section, or when the detected frame to be played back is a silence frame, or when the significance of the detected frame is less than or equal to a predetermined threshold value.

4. The stream data reception/playback apparatus according to claim 3, wherein the frame detection section determines the significance of the detected frame based on the number of bits of the frame.

5. A communication terminal apparatus, comprising the stream data reception/playback apparatus according to claim 1.

6. A base station apparatus, comprising the stream data reception/playback apparatus according to claim 1.

7. The stream data reception/playback apparatus according to claim 1, wherein the synchronization difference calculation section calculates the synchronization difference from a time stamp of the received packetized stream data.

8. The stream data reception/playback apparatus according to claim 1, wherein the playback speed control section interpolates the sample data, the amount of the sample data corresponding to the first threshold value, to a frame when the synchronization difference is a positive value equal to or greater than the first threshold value, and decimates the sample data, the amount of the sample data corresponding to the first threshold value, from a frame when the synchronization difference is a negative value equal to or less than a negative value of the first threshold value.

9. The stream data reception/playback apparatus according to claim 1, wherein, when the absolute value of the synchronization difference is equal to or greater than a second threshold value which is greater than the first threshold value, the playback speed control section adjusts the playback speed regardless of whether or not the frame to be played hack is detected by the frame detection section.

10. The stream data reception/playback apparatus according to claim 9, wherein the playback speed control section interpolates sample data, an amount of the sample data corresponding to the second threshold value, to a frame when the synchronization difference is a positive value equal to or greater than the second threshold value, and decimates the sample data, the amount of the sample data corresponding to the second threshold value, from a frame when the synchronization difference is a negative value equal to or less than a negative value of the second threshold value.

11. The stream data reception/playback apparatus according to claim 9, wherein:
   the frame detection section is configured to decide whether or not the detected frame is a silence frame; and
   the playback speed control section further adjusts the playback speed of the stream data when the frame which is detected in the frame detection section and which is played back is the silence frame.

12. The stream data reception/playback apparatus according to claim 11, wherein the playback speed control section interpolates sample data, an amount of the sample data corresponding to a third threshold value, to a frame when the synchronization difference is a positive value equal to or greater than the third threshold value which is greater than the first threshold value and is less than the second threshold value, and decimates the sample data, the amount of the sample data corresponding to the third threshold value, from a frame when the synchronization difference is a negative value greater than a negative value of the second threshold value and is equal to or less than a negative value of the third threshold value.

13. The stream data reception/playback apparatus according to claim 9, wherein:
the frame detection section is further configured to measure a number of bits of the detected frame, and
the playback speed control section further decides whether the measured number of bits is great or small and adjusts the playback speed of the stream data when the number of bits is small.

14. The stream data reception/playback apparatus according to claim 13, wherein the playback speed control section interpolates sample data, an amount of the sample data corresponding to a fourth threshold value, to a frame when the synchronization difference is a positive value equal to or greater than the fourth threshold value which is greater than the first threshold value and less than the second threshold value, and decimates the sample data, the amount of the sample data corresponding to the fourth threshold value, from a frame when the synchronization difference is a negative value that is greater than a negative value of the second threshold value and is equal to or less than a negative value of the fourth threshold value.

15. A communication system comprising:
a stream data transmitting apparatus; and
a stream data reception/playback apparatus according to claim 1, wherein the receiving section of the stream data reception/playback apparatus receives the packetized stream data transmitted from the stream data transmitting apparatus through a network.

16. A stream data reception/playback method, comprising:
receiving packetized stream data;
storing a frame group of the received stream data in a receiving buffer;
detecting whether the frame group includes a frame to be played back;
calculating a synchronization difference between an internal clock of a transmitting side and an internal clock of a receiving side from the received packetized data stream; and
adjusting a playback speed of the stream data when the detecting step detects no frame to be played back and an absolute value of the synchronization difference is equal to or greater than a first threshold, wherein the first threshold is a positive value corresponding to an amount of sample data to be interpolated or decimated for adjusting the playback speed of the stream data.

17. The stream data reception/playback method according to claim 16, wherein the synchronization difference is calculated from a time stamp of the received packetized stream data.

* * * * *